US008582886B2

(12) United States Patent
Abdo et al.

(10) Patent No.: US 8,582,886 B2
(45) Date of Patent: Nov. 12, 2013

(54) COMPRESSION OF TEXT CONTENTS FOR DISPLAY REMOTING

(75) Inventors: Nadim Y. Abdo, Redmond, WA (US); Voicu Anton Albu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 13/111,297

(22) Filed: May 19, 2011

(65) Prior Publication Data

US 2012/0294523 A1    Nov. 22, 2012

(51) Int. Cl.
*G06K 9/34*    (2006.01)
(52) U.S. Cl.
USPC .......................................................... 382/176
(58) Field of Classification Search
CPC ............ G06K 9/00; G06K 9/34; G06K 9/36; G06K 9/42; G06K 9/72
USPC .................. 382/176–180, 186–187, 229–230
See application file for complete search history.

(56) References Cited

U.S. PATENT DOCUMENTS

| 4,024,500 | A | * | 5/1977 | Herbst et al. ................... 382/178 |
| 5,557,689 | A | * | 9/1996 | Huttenlocher et al. ....... 382/177 |
| 7,085,420 | B2 | | 8/2006 | Mehrotra |
| 7,844,848 | B1 | | 11/2010 | Hobbs |
| 2005/0131887 | A1 | | 6/2005 | Rohrabaugh et al. |
| 2008/0244081 | A1 | | 10/2008 | Elangovan et al. |

OTHER PUBLICATIONS

"Remote Desktop Protocol (RDP)—Technical Analysis", iTRACTION—In depth technical analysis of the RDP protocol, http://www.itraction.nl/nl/working-online-met-itraction-oplossingen/rdp.html, accessed Mar. 14, 2011, 6 pages.
"Remote Graphics Software-Secure, Collaborative Access", Secure, collaborative access, May 2010, 4 pages.
"Windows 7 with RDP7 : Best OS for VDI—Remote Desktop Services (Terminal Services) Team Blog", http://blogs.msdn.com/b/rds/archive/2009/11/02/windows-7-with-rdp7-best-os-for-vdi.aspx, accessed Mar. 14, 2011, 4 pages.
Yang et al., "The Performance of Remote Display Mechanisms for Thin-Client Computing", Proceedings of the 2002 USENIX Annual Technical Conference, Monterey, California, USA, Jun. 10-15, 2002, 17 pages.

* cited by examiner

*Primary Examiner* — Jose Couso
(74) *Attorney, Agent, or Firm* — Woodcock Washburn, LLP

(57) ABSTRACT

Embodiments of the invention compress an image that contains a representation of text. Embodiments take an image of graphical data and determines one or more portions of that image that have a high probability of containing text. Embodiments then take each such portion of the image and determines one or more rows of text within each portion (where text does, in fact, exist within the portion). The embodiments then traverse each vertical band of pixels of each row to determine sub-glyphs. Where a particular sub-glyph is encountered for the first time, the embodiments cache that sub-glyph, and send it (or a compressed representation thereof) to a client in a remote presentation session. Where a particular sub-glyph has been cached already, the embodiments send a reference to that cached vertical band to the client.

20 Claims, 10 Drawing Sheets

The quick brown fox jumped over the lazy dog.
Lorem ipsum dolor sit amet.

COMPRESSION OF TEXT CONTENTS FOR DISPLAY REMOTING

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server's processing results in output, such as graphical output or sound, this output is sent to the client for presentation. In this manner, applications appear to a user of the client to execute on the client when, they in fact, execute on the server.

The graphical output generated by the server in a remote presentation often taxes, or even exceeds, the bandwidth available between the client and the server. In view of this limitation of bandwidth, it is common for the server to compress the graphical data before transmitting it across the communications network. When the client receives this compressed data, it then un-compresses the data before displaying it.

There are many problems with compressing graphical data for transmission across a communications network, some of which are well known.

SUMMARY

One way that graphical data is compressed for in a remote presentation session is by identifying and extracting text in the graphical data. Text is commonly found in graphical data in a remote presentation session because a user's desktop is being displayed, along with application windows, such as those for web browsers or text editors, in which text is displayed. In some scenarios, the applications whose graphical output is being sent via the remote presentation session are aware of the remote presentation session, and inform the part of the server that encodes the graphical output about which parts of the graphical output are text, and what that text is. However, in other scenarios, the remote presentation session encoder receives only images, such as bitmap images, and must extract the text from those images (though the encoder may receive an indication of which parts of the image are text, though not receive an indication of what that text is).

In an embodiment of the invention, a remote presentation server takes an image of graphical data and determines one or more portions of that image that have a high probability of containing text. The server takes each such portion of the image and determines one or more rows of text within each portion (where text does, in fact, exist within the portion). The server then traverses each vertical band, or column, of each row to determine sub-glyphs (or image portions). Where a particular sub-glyph is encountered for the first time, the server caches that sub-glyph, and prepares to send it (or a compressed representation thereof) to the client. Where a particular sub-glyph has been cached already, the server prepares to send a reference to that cached sub-glyph to the client.

This output stream of cached sub-glyphs and references thereto is then compressed by the server, along with the rest of the image, and transmitted to the client in accordance with the remote presentation session protocol. The client receives this transmission, decodes it, and displays a representation of the image on a display device.

BRIEF DESCRIPTION OF THE DRAWINGS

FIG. 5 depicts an example image containing text, similar to an identified portion in FIG. 4, where the text may be compressed in accordance with the present invention.

DETAILED DESCRIPTION OF ILLUSTRATIVE EMBODIMENTS

Figure 1:
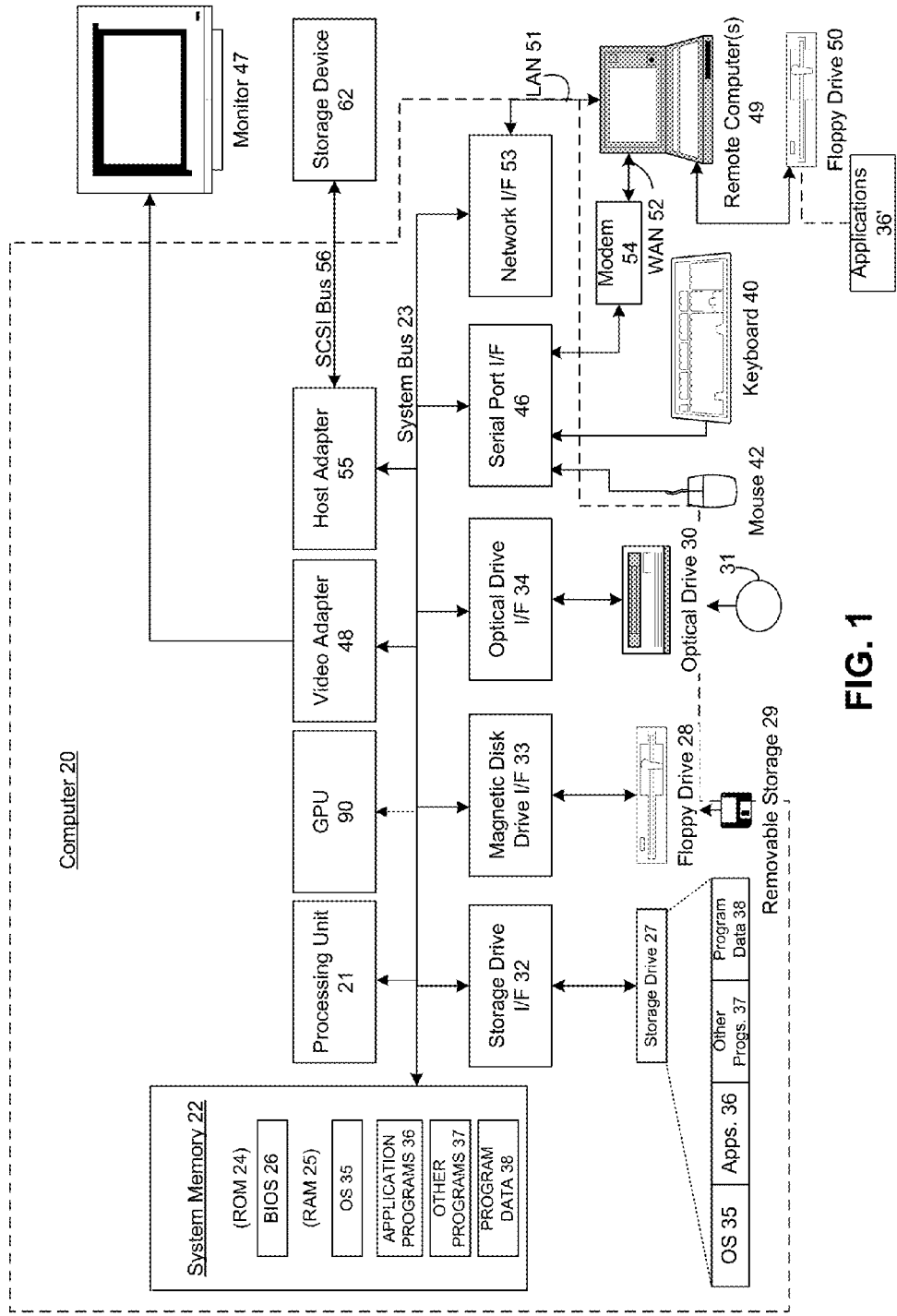
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
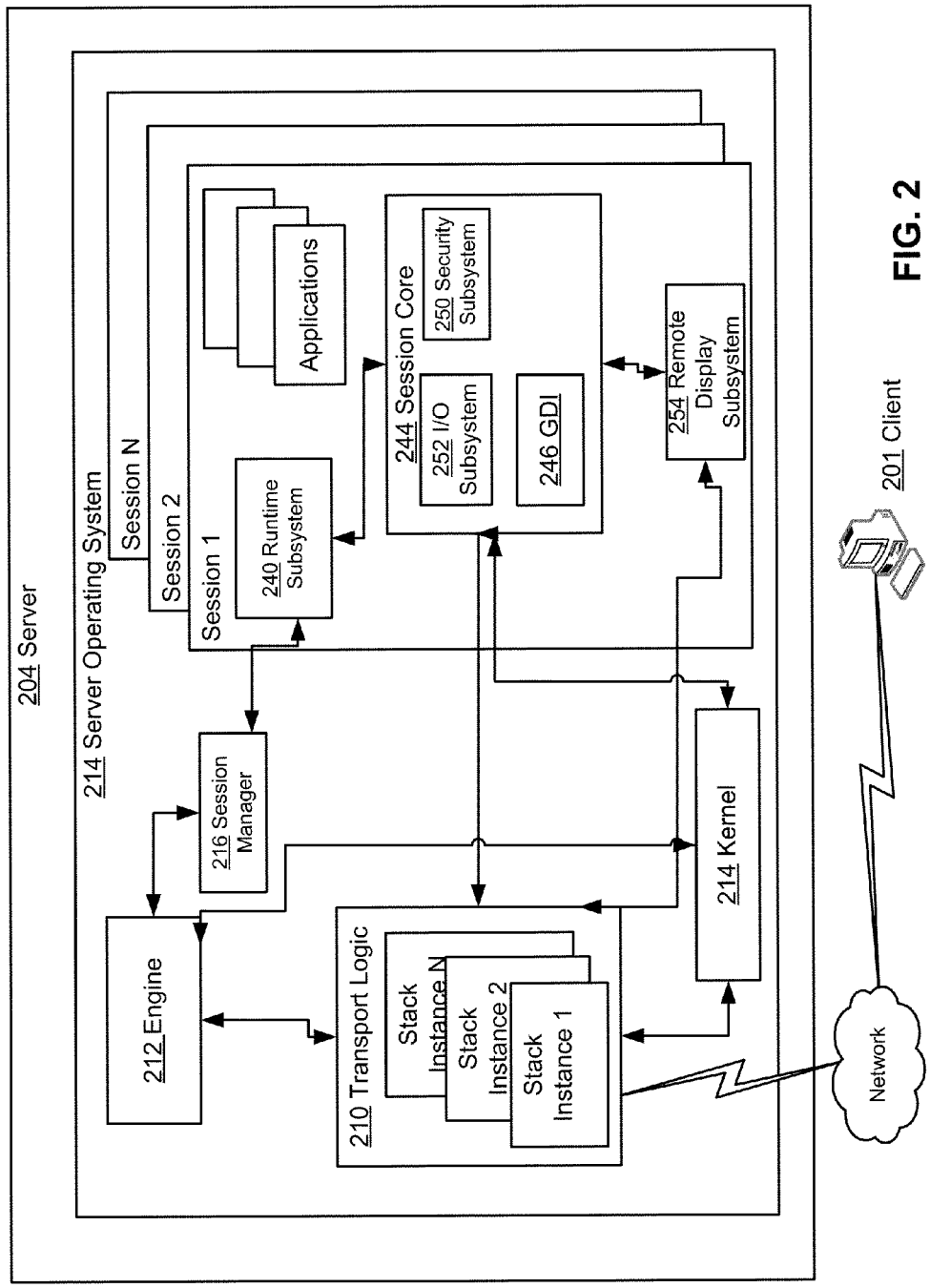
FIG. 2 depicts an example remote presentation session server in which embodiments of the invention may be implemented.

FIG. 2 generally illustrates an example environment wherein aspects of the present invention can be implemented. For instance, the server 204 may implement the operational procedures of FIGS. 9, 10 and/or 11. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
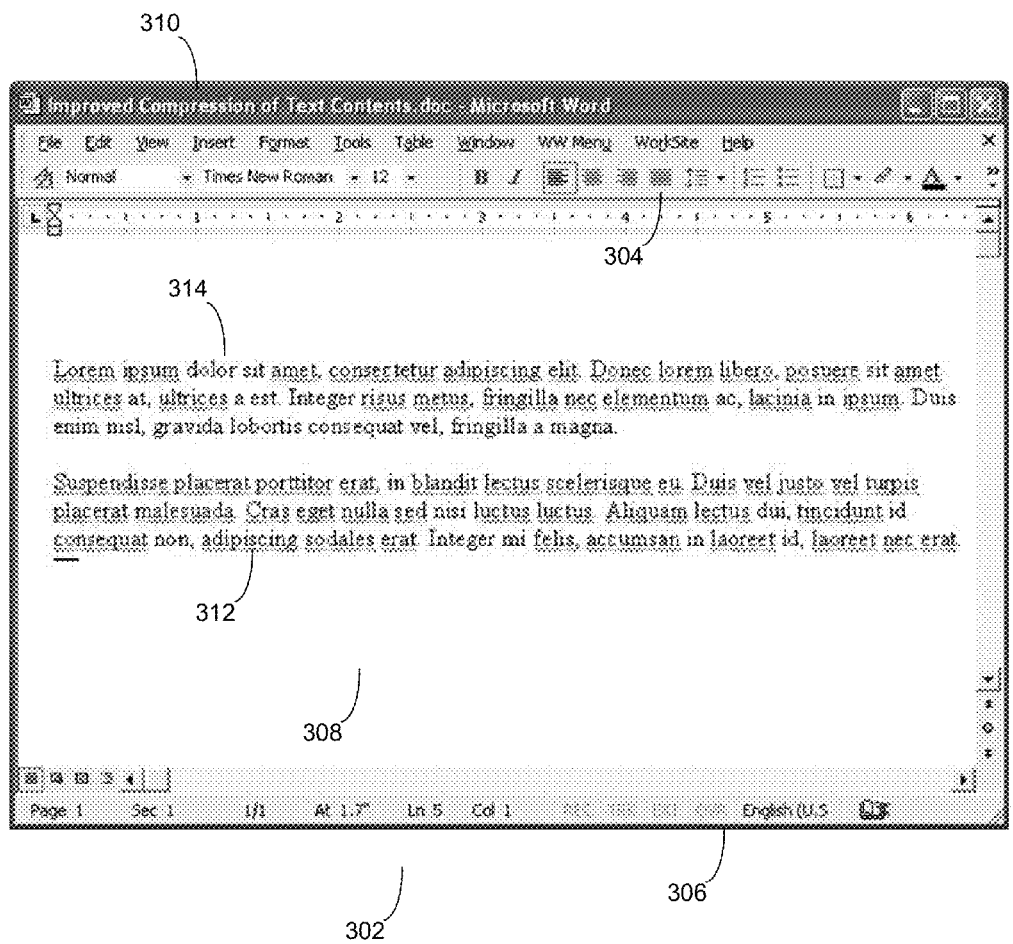
FIG. 3 depicts an example image from which text may be identified and compressed.

FIG. 3 depicts an example image from which text may be identified and compressed. Image 302 comprises a window for a text editor program. Whereas image 302 depicts a text editor window, it is not a text editor window—it is an image that depicts such a window. Whereas the text editor window itself may have contained some indication of which parts of it were text (and what glyphs make up that text) and which parts of it were not text, here image 302 is only an image, and, in embodiments, it may not carry with it an indication of what the represented text is. Image 302 comprises function buttons 304 that control various functions of the text editor, window border 306, window body 308 that displays text from a document being edited with the text editor program, and title area 310 that displays the title of the document being edited. Displayed within window body 308 are two segments of text—text 312 and text 314.

Embodiments of the invention may be used to compress some or all text of image 302. For example, embodiments may be used to compress text 312 and/or 314, as well as any text contained in other parts of image 302, such as text in title 310, or buttons 304.

Figure 4:
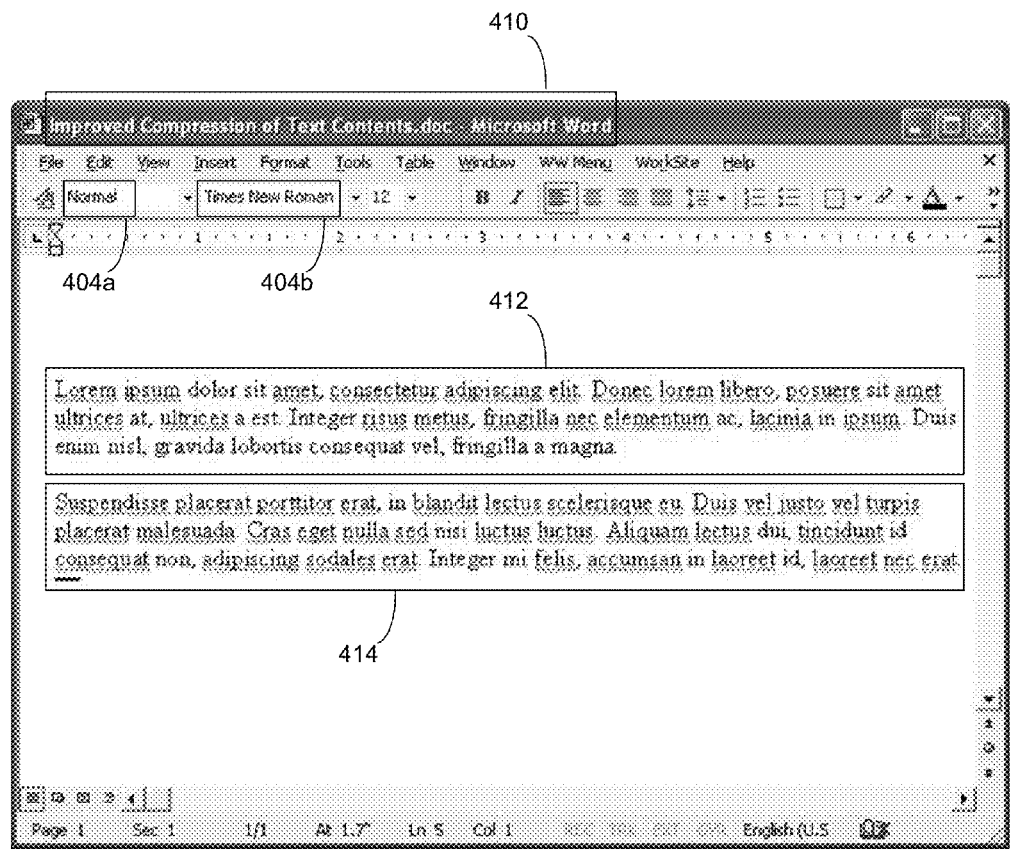
FIG. 4 depicts the image of FIG. 3 after portions of the image that have a high probability of containing text have been identified.

FIG. 4 depicts the image of FIG. 3 after portions of the image that have a high probability of containing text have been identified. Here, portions 404, 410, 412, and 414 have been identified as being likely to contain text. Portions 404a and 404b correspond to some of the text in buttons 304 of FIG. 3. Note that, as depicted, not all of the text contained within buttons 304 was identified as probably containing text. This may have occurred for several reasons. For example, it may be that the single letter "B" was too small a segment of text for the invention to identify it as such, or that the invention determines that the compression improvement of compressing the lone letter is outweighed by the associated computational cost of performing the compression.

Portion 410 corresponds to the text contained within title 310 of FIG. 3. Portions 412 and 414 correspond to text 312 and text 314 of FIG. 3, respectively. While both text 312 and 314 may be encompassed within the same portion rectangle without that rectangle also encompassing any non-text graphic of image 302, as depicted, they have been identified as separate portions. This may be, for instance, because there is sufficient non-text whitespace between text 312 and 314 that the invention "closed" portion 412, and then "opened" a new portion 414 when the white space ended and it encountered text 314.

Embodiments of the invention may identify portions of the image that are likely to be text (such as portions 404 and 410-414), as follows. Embodiments may determine areas of the image that have a high frequency—areas where there is an abrupt change in color (such as from a white background to black text, though the background and text need not be white and black, or even just one color). Embodiments may compare successive rows of pixels of the image and determine where there is a large change between the ratio of background pixels to foreground pixels (e.g. non-background pixels), and determine that these are likely to be the edges of portions of text. For instance, as depicted with portion 414, the row of pixels in image 302 immediately above portion 414 is all white pixels. Then, the topmost row of pixels in portion 414 comprises a mixture of white pixels and black pixels. The white pixels may be considered to be background pixels because of the large number of them, and then the black pixels may be considered to be foreground pixels because they are not background pixels.

In embodiments, the background color is not white, or even one color, and the foreground color is not black, or even one color. For instance, the background may comprise a photograph. Rather than exclusively looking for a change from one color to another, areas of high frequency change may be determined. These areas of high frequency change correspond to areas having abrupt tonal transitions in a small space, such as where foreground pixels abut background pixels. These areas of high frequency changes may then be determined to be at or near the edge of a portion of the image.

FIG. 5 depicts an example image containing text, similar to an identified portion in FIG. 4, where the text may be compressed in accordance with the present invention. There are two lines of text in portion 500—line 502 and line 504. The text in portion 500 may be identified and compressed. For instance, the "o" in "brown" of line 502 is the same as the "o" in "dog" of line 502, and this redundancy may be used to compress the text represented. Similarly, text may be compressed across lines—the "o" in "brown" of line 502 is also the same as the "o" in "Lorem" of line 504. In addition to compression at the level of letters or characters—"glyphs"—compression may also be done at the level of parts of letters or characters—"sub-glyphs"—where sub-glyphs are redundant within the text of a portion. This is described in more detail with respect to FIGS. 6 and 7.

Figure 6:
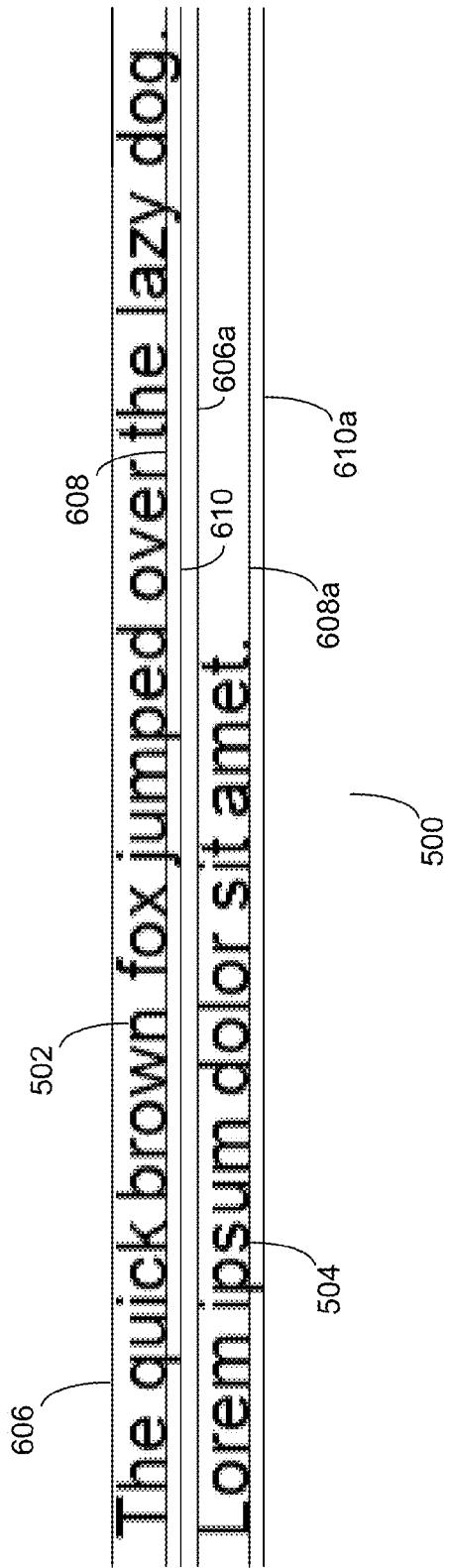
FIG. 6 depicts the example text of FIG. 5 after the top, bottom, and origin of each row of the text has been identified.

FIG. 6 depicts the example text of FIG. 5 after the top, bottom, and origin of each row of the text has been identified. Line 502 has a top 606, origin 608, and bottom 610. The top is a horizontal line above which no pixel of the line exists. The origin is a horizontal line upon below which most glyphs do not extend. For example, in line 502, none of "T," "h," "e," "u," "i," "c," or "k" extend below the origin 608, though "q" does. The bottom is a horizontal line below which no pixel of the line exists. Likewise, line 504 also has a top 606a, origin 608a, and origin 608.

The color of background or foreground pixels may not be monochromatic, or where it is monochromatic for part of the line of text, it may change for another part of the line of text. Pixels may be determined to be background pixels where they make up the majority (or at least some threshold) of a row of pixels. They may be determined to be background pixels where this majority of pixels shares roughly similar frequencies—there are not drastic changes between nearby pixels that would result in a high frequency change when representing the pixels in the frequency domain. Likewise, foreground pixels may be determined to be those pixels that do have high frequency changes relative to background pixels.

In embodiments, determining a top and bottom of a row of text within the image based on a number of background pixels in two adjacent horizontal rows of pixels of the image comprises determining the top and bottom of the row of text based on a distribution of background pixels to foreground pixels in the two adjacent horizontal rows of pixels. A row of pixels that does not contain any part of text (e.g. the row of pixels immediately above the row of text) is likely to have mostly pixels determined to be background pixels, and few, if any, pixels determined to be foreground pixels. Likewise, the topmost row of pixels in a row of text is likely to have more foreground pixels than the row of pixels immediately above it. By comparing the distribution of foreground to background pixels in adjacent rows of pixels, the top of a row of text may be identified.

Similarly, the bottommost row of pixels in a row of text is likely to have more foreground pixels than the row of pixels directly below it (which is not a part of the row or text). Given that, the bottom of a row of text may be identified by comparing the distribution of foreground to background pixels in adjacent rows of pixels.

The origin may also be determined based on comparing the distribution of foreground to background pixels in successive rows of text. It is common for each glyph in a row of text to touch the origin line, and it is common that not all glyphs descend below the origin line. For example, this string of glyphs all touch the origin line but do not descend below it—abcdef—while this string of glyphs all touch the origin line and also descend below it—gjpqy. Given that, the row of pixels at the origin line is likely to have more foreground pixels than the row of pixels directly below it, though the row of pixels directly below it is likely to also have foreground pixels (except for the case where the origin line is the same as the bottom, such as with "abcdef").

Figure 7:
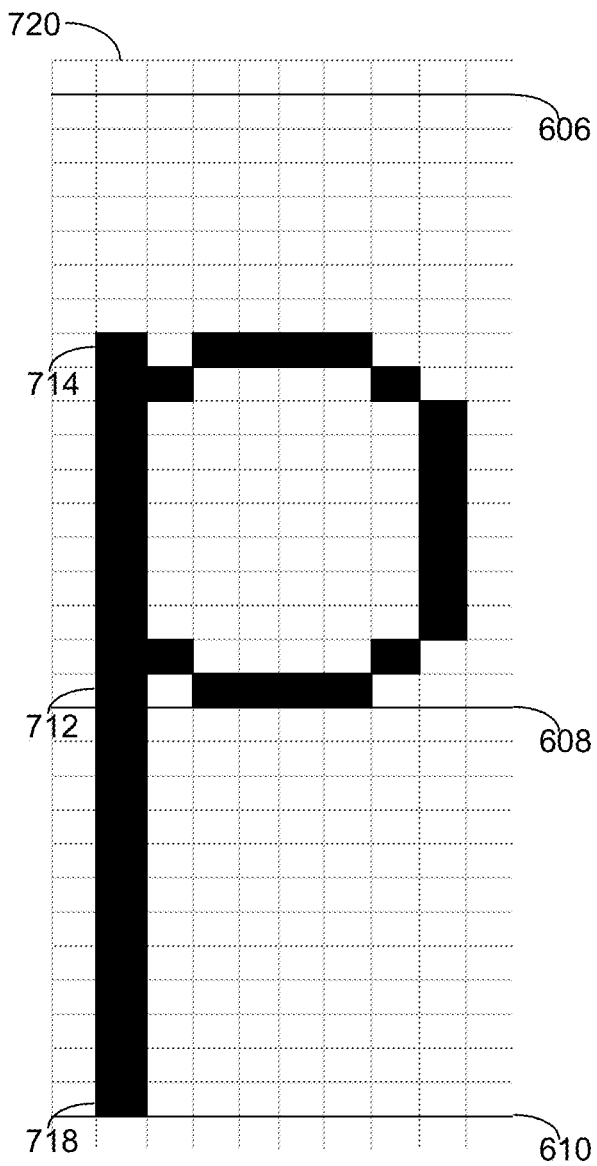
FIG. 7 depicts traversing a row of text of FIG. 6 to identify sub-glyphs.

FIG. 7 depicts traversing a row of text to identify subglyphs. This line of text may be lines 502 or 504 of FIGS. 5-6 and involve the use of the top 606, origin 608, and bottom 610. A row of text is traversed by examining successive sub-glyphs of the rows—vertical bands that extend from the top 606 to the bottom 610.

Starting at origin 608, the vertical band of pixels 720 is traversed up to the top 606. All pixels between the origin and the topmost foreground pixel are kept, and any pixels between the topmost foreground pixel and the top 606 may be discarded. Likewise, starting at origin 608, the vertical band 720 of pixels is traversed down to the bottom 610. All pixels between the origin and the bottommost foreground pixel are kept, and any pixels between the bottommost foreground pixel and the top 606 may be discarded. As depicted, when traversing from the origin 608 to the top 608, there are pixels to be discarded. Pixel 712 is the pixel just above the origin, and the vertical band of pixels 720 is traversed up to pixel 714, which is the topmost foreground pixel. The vertical band of pixels is further traversed up to the top 608, and topmost pixel 716, however, all pixels above pixel 714 are background pixels and are discarded.

Likewise, the vertical band of pixels 720 is traversed from the origin 608 to the bottommost pixel 610 to determine the bottommost foreground pixel. Here, the bottommost foreground pixel 718 is also the bottommost pixel of vertical band of pixels 720, so no pixels below the origin 608 in the vertical band of pixels are discarded.

The reason that the pixels above the topmost foreground pixel and below the bottommost foreground pixel may be discarded is because a glyph may not always have the same position relative to top 606 and bottom 610. For example, pixel 712 in letter "p" may be at the top of some lines of text. The line of text "possum" has no foreground pixels that are above pixel 712, so whereas in FIG. 7, the top is well above pixel 712, in the "possum" example, the top would be set at pixel 712. If the background pixels between the topmost foreground pixel and the top were kept, then the representation of these two "p"s would not be the same—the "p" in FIG. 7 would be represented using extra background pixels above the topmost pixel that were not used in the representation in the "p" of "possum."

Figure 8:
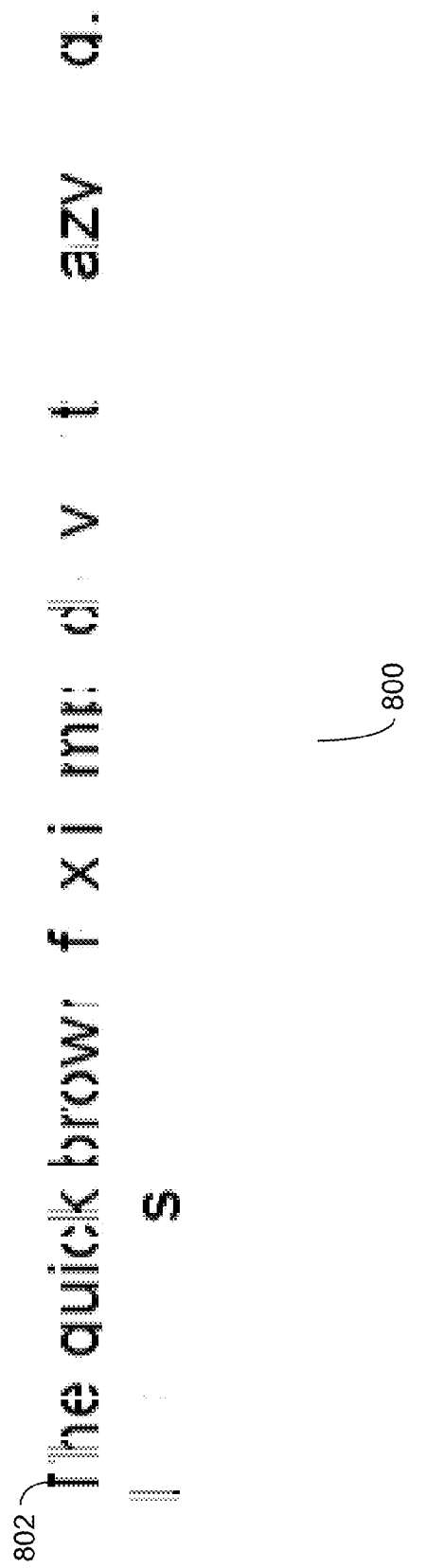
FIG. 8 depicts sub-glyphs that have been extracted from the rows of text of FIG. 6 by using the techniques of FIG. 7

FIG. 8 depicts sub-glyphs that have been extracted from the rows of text of FIG. 6 by using the techniques of FIG. 7, with repeated sub-glyphs removed from extracted unique sub-glyphs 800. Of note is that not even full glyphs have been extracted, but rather sub-glyphs—those sub-glyphs in a line of text that are unique within the portion. It may be appreciated that in more complex types of fonts—such as MICROSOFT CLEARTYPE—there are subtle differences between many sub-glyphs, So, whereas the base of the "T" represented by extracted sub-glyphs 802 spans more than one pixel in width, that base of the "T" comprises multiple individually extracted sub-glyphs of one pixel in width, rather than one multi-pixel wide sub-glyph.

Figure 9:
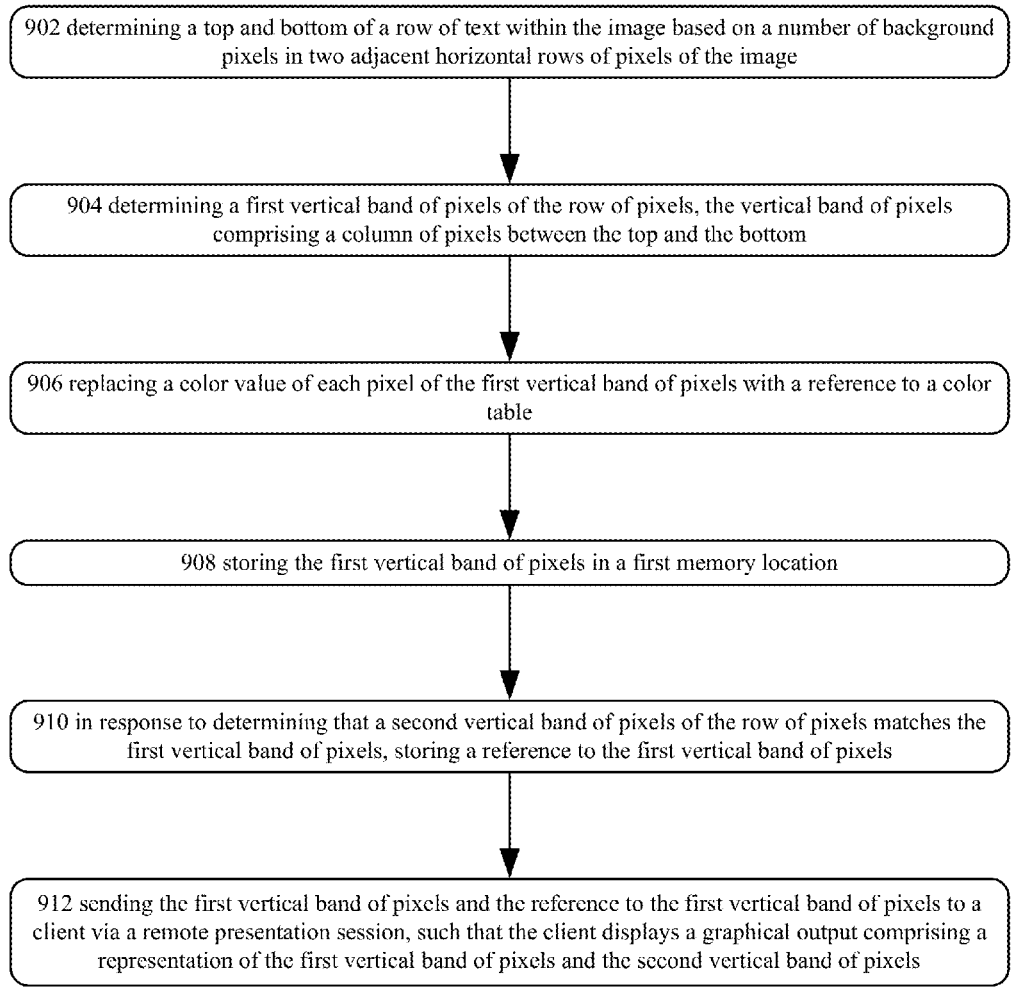
FIG. 9 depicts example operational procedures for compressing text.

FIG. 9 depicts example operational procedures for compressing text. These operational procedures may be implemented on computer 20 of FIG. 1 or server 204 of FIG. 2 to compress text represented in image 302 of FIG. 3 in accordance with that which is depicted in FIGS. 4-8. It may be appreciated that there are embodiments of the invention that do not implement every operation of FIG. 9, or that implement the operations of FIG. 9 in a different order than depicted in FIG. 9.

Operation 902 depicts determining a top and bottom of a row of text within the image based on a number of background pixels in two adjacent horizontal rows of pixels of the image. Determining a top and a bottom of a row of text may be performed in a manner similar to as described with respect to FIG. 6. The image may contain multiple rows of text, and in embodiments of operation 902, a top and bottom is determined for multiple rows. In embodiments, two rows of text may have the same horizontal position and be separated by a divider (e.g. blank space, an photo, or a non-text feature).

Operation 904 depicts determining a first vertical band of pixels of the row of pixels, the vertical band of pixels comprising a first sub-glyph between the top and the bottom. Operation 904 may be performed in a manner similar to as described with respect to FIG. 7. In embodiments, the first sub-glyph does not contain every pixel in the vertical band between the top and the bottom. As described with respect to FIG. 7, the vertical band may omit those background pixels that appear either above the topmost foreground pixel or below the bottommost background pixel.

Operation 906 depicts replacing a color value of each pixel of the first sub-glyph with a reference to a color table, the reference being expressed in fewer bits than the color value before storing the first sub-glyph in the first memory location. It may be that the text is represented with only one or a few color values, whereas the image from which the text is taken represents color values using a much larger color space—such as 24-bit color (allowing for up to 16,777,216 unique color values). In such a scenario, it may not be necessary to represent each color with such a large value, since many fewer values exist. Therefore, each pixel may have its color value represented with a reference to a color table, and the color value may be stored at the referenced place in the color table. For instance, let there be four possible colors in the pixels of the text. Four values may be represented using two bits. Then, each 24-bit representation of a color for a pixel may be replaced with a two bit reference to the pixel's color value in a table. For instance, where the color value for a pixel is 0x000000 (commonly used to refer to black), and black is referenced in the table via 0b01, the pixel's 24-bit reference to 0x000000 may be replaced with the two-bit 0b01.

In embodiments, operation 906 is performed while performing operation 904. For example, while storing the first sub-glyph in a cache of a processor to determine the first sub-glyph, the operations of determining a color of a first pixel of the first sub-glyph; storing a reference to the color in a table, the reference being expressed in fewer bits than the color is expressed in; and replacing the color of the first pixel with the reference to the color are also performed. It may be that, in embodiments, transferring data among memories may negatively impact the performance of the operations, so it is desirable to perform operations on the data that is stored in a high-level cache of the CPU, when possible. A computer system may contain a hard disk, or flash memory, RAM, L1 cache, L2 cache, L3 cache, and a TLB (translation lookaside buffer). Where the operations of FIG. 9 execute on such a computer system, when the system has loaded the data for part or all of the first vertical band of pixels in the TLB, to perform operation 904, the system also performs operation 906 while that part or all of the first vertical band of pixels is in the TLB.

Operation 908 depicts storing the first sub-glyph in a first memory location. Once the first sub-glyph has been identified in operation 904, and possibly modified in operation 906, it may be stored in a cache. Then, when successive sub-glyphs are identified that match the first sub-glyph, they may be stored as a reference to the cached first sub-glyph.

Operation 910 depicts, in response to determining that a second sub-glyph of the row of pixels matches the first sub-glyph, storing a reference to the first sub-glyph. Here, the second sub-glyph matches the first sub-glyph It may be that the second sub-glyph and the first sub-glyph are taken from two instances of the same glyph, and it may be that they are taken from two different glyphs, or both from the same instance of one glyph. For instance, in certain fonts, the stem of the letter "h" may be the same as the stem of "l." In this case, the first sub-glyph may be the stem of "h," the second sub-glyph is the stem of "l," and since they are identical, a match is detected.

Operation 912 depicts compressing the first sub-glyph and the reference to the first sub-glyph before sending the first sub-glyph and the reference to the first sub-glyph to the client. For instance, the first sub-glyph and the reference thereto may be run-length encoded to remove contiguous runs of zeros (or other values), entropy encoded, and bit-packed to compress the amount of space with which they are stored.

Operation 912 depicts sending the first sub-glyph and the reference to the first sub-glyph to a client via a remote presentation session, such that, in response to receiving the first sub-glyph and the reference to the first sub-glyph, the client displays a graphical output comprising a representation of the first sub-glyph and the second sub-glyph. Where a color table is used, such as described with respect to operation 906, operation 912 may include sending the color table to the client. In embodiments, the entries of the table may be pre-determined by the server and the client at the start of the remote presentation session or before the present remote presentation session occurs. In response to receiving the first sub-glyph and the reference thereto, the client may perform operations re-assemble the row of text (or a representation thereof, where lossy compression is used during the remote presentation session, such as in operation 912), and display that re-assembled row. Where the client is sent a representation of the image from which the row was taken, the client may display the representation of the row along with the rest of the image, the row being displayed in its location within the image.

Figure 10:
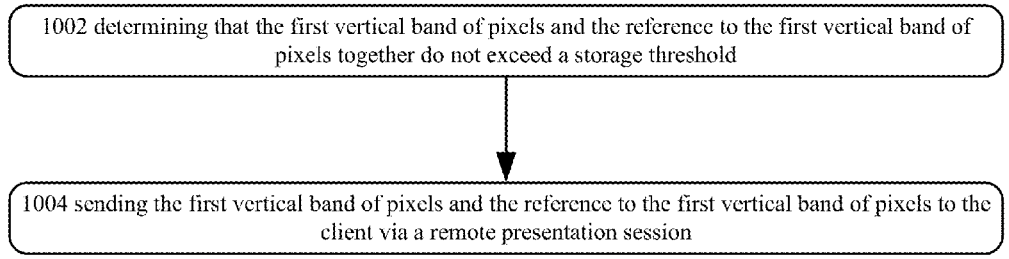
FIG. 10 depicts example operational procedures for sending image data to a client via a remote presentation session.

FIG. 10 depicts example operational procedures for sending image data to a client via a remote presentation session. Embodiments of operation 912 of FIG. 9 may be implemented with the operational procedures of FIG. 10.

Operation 1002 depicts determining that the first sub-glyph and the reference to the first sub-glyph together do not exceed a storage threshold. There may be instances where extracting sub-glyphs—sub-glyphs—of text of the image and replacing repeated vertical bands with references to the first occurrence of that vertical band does not reduce in a sufficient storage savings. The storage savings may be insufficient, for instance, because this technique requires more storage space than the representation of text itself, without using these compression techniques. In embodiments, the storage savings may be insufficient because it is a savings over storing the representation of the text itself, but the cost of the amount of additional processing that is performed by the server and the client to effectuate this compression exceeds the value of the storage space (and/or bandwidth) saved through using the compression.

In view of these considerations, in embodiments, after the first sub-glyph has been identified, and the second sub-glyph has been identified as matching the first, the following determination is made. It is determined whether the first vertical band and a reference to the first vertical band (standing in for the second vertical band) can be stored in an amount of space that does not exceed a storage threshold, as described above. Where this is the case, operation 1002 is satisfied, in that it is determined that the first sub-glyph and the reference to the first sub-glyph together do not exceed a storage threshold, and the process flow continues to operation 1004. The operational procedures of FIG. 11 depict embodiments where such a storage threshold is exceeded.

Operation 1004 depicts sending the first sub-glyph and the reference to the first sub-glyph to the client via a remote presentation session. This may be effectuated in a manner similar to operation 912 of FIG. 9.

Figure 11:
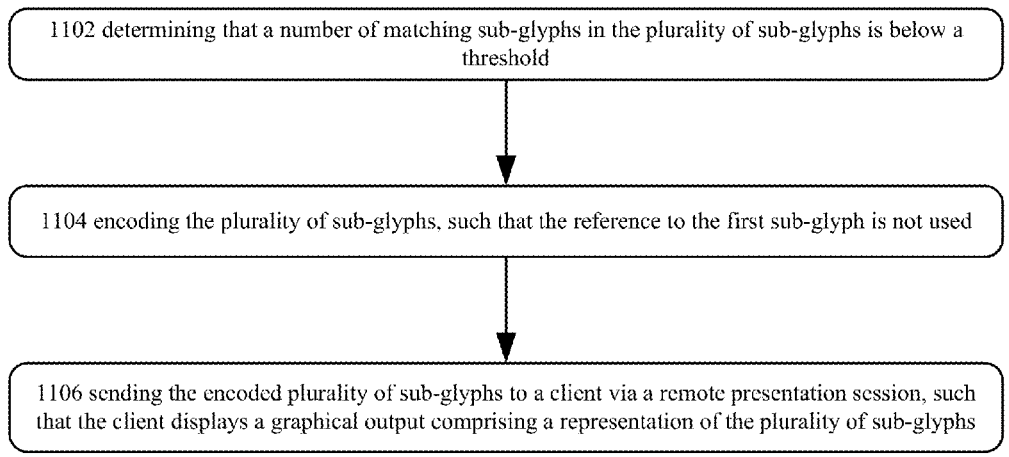
FIG. 11 depicts example operational procedures for sending image data to a client via a remote presentation session.

FIG. 11 depicts example operational procedures for sending image data to a client via a remote presentation session. Embodiments of operation 912 of FIG. 9 may be implemented with the operational procedures of FIG. 11. FIG. 11 depicts embodiments where the row of text comprises a plurality of sub-glyphs, and this plurality of sub-glyphs comprises the first and second sub-glyphs.

Operation 1102 depicts determining that a number of matching sub-glyphs in the plurality of sub-glyphs is below a threshold. There may be text for which carrying out the operational procedures of FIG. 9 to determine matching sub-glyphs, and substituting references to one of those sub-glyphs for all later matches to it is not preferable to performing different encoding operations. For instance, there may be a row of text that comprises 800 sub-glyphs, but only has one repeated sub-glyph out of all 800—the second sub-glyph that matches the first sub-glyph. In a scenario like this, it may be preferable to use different encoding operations. Determining whether to use different encoding operations may be performed by comparing the number of matching sub-glyphs in a row of text to be encoded against a threshold. This threshold may be a minimum percentage of matching sub-glyphs in the line. For instance, the threshold may be that at least 75% of the sub-glyphs must match. So, where the row of text comprises 800 sub-glyphs, at least 600 of those sub-glyphs would need to match another sub-glyph in the row of text. In other embodiments, rather than a percentage, the threshold may be an absolute number or otherwise quantify the amount of matching sub-glyphs in the row of text. Operation depicts an embodiment where the number of sub-glyphs Operation 1104 depicts encoding the plurality of sub-glyphs sub-glyphs, such that the reference to the first sub-glyph is not used. Since the number of matching sub-glyphs in the plurality of sub-glyphs is below a threshold, different encoding operations will be used than encoding operations that include encoding matching sub-glyphs as references to a single instance of that sub-glyph. Operation 1104 depicts using those different encoding operations to encode the plurality of sub-glyphs.

Operation 1106 depicts sending the encoded plurality of sub-glyphs to a client via a remote presentation session, such that, in response to receiving the encoded plurality of sub-glyphs, the client displays a graphical output comprising a representation of the plurality of sub-glyphs. Operation 1106 may be effectuated in a manner similar to operation 912 of FIG. 9.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for compressing an image, comprising:
   determining, by one or more computing devices, a top and bottom of a row of text within the image based on a number of background pixels in two adjacent horizontal rows of pixels of the image;
   determining, by the one or more computing devices, a first vertical band of pixels of the row of text, the first vertical band of pixels spanning between the top and bottom and comprising a first image portion;

storing, by the one or more computing devices, the first image portion in a first memory location; and in response to determining that a second vertical band of pixels of the row of text comprises a second image portion that matches the first image portion, storing, by the one or more computing devices, a reference to the first image portion.

2. The method of claim 1, further comprising:

while storing the first vertical band of pixels in a cache of a processor to determine the first vertical band of pixels, determining a color of a first pixel of the first image portion;

storing a reference to the color in a table, the reference being expressed in fewer bits than the color is expressed in; and replacing the color of the first pixel with the reference to the color.

3. The method of claim 1, further comprising:

sending the first image portion and the reference to the first image portion to a client via a remote presentation session, such that, in response to receiving the first image portion and the reference to the first image portion, the client displays a graphical output comprising a representation of the first image portion and the second image portion.

4. The method of claim 3, wherein sending the first image portion and the reference to the first image portion to the client via a remote presentation session comprises:

sending the first image portion and the reference to the first image portion to the client via a remote presentation session in response to determining that the first image portion and the reference to the first image portion together do not exceed a storage threshold.

5. The method of claim 3, further comprising:

compressing the first image portion and the reference to the first image portion before sending the first image portion and the reference to the first image portion to the client.

6. The method of claim 1, wherein the row of text comprises a plurality of image portions, the plurality of image portions comprising the first and second image portions, and further comprising:

determining that a number of matching image portions in the plurality of image portions is below a threshold;

encoding the plurality of image portions, such that the reference to the first image portion is not used; and sending the encoded plurality of image portions to a client via a remote presentation session, such that, in response to receiving the encoded plurality of image portions, the client displays a graphical output comprising a representation of the plurality of image portions.

7. The method of claim 1, further comprising:

replacing a color value of each pixel of the first image portion with a reference to a color table, the reference being expressed in fewer bits than the color value before storing the first image portion in the first memory location.

8. The method of claim 1, wherein determining the top and bottom of the row of text within the image based on the number of background pixels in two adjacent horizontal rows of pixels of the image comprises:

determining the top and bottom of the row of text based on a distribution of background pixels to foreground pixels in the two adjacent horizontal rows of pixels.

9. The method of claim 1, further comprising:

determining a top and a bottom of a second row of text within the image; and in response to determining that a third vertical band of pixels of the second row of text comprises a third image portion that matches the first image portion, storing a second reference to the first image portion.

10. The method of claim 1, wherein the row of text has an origin, and further comprising:

traversing the first vertical band of pixels from the origin to the top to determine a topmost foreground pixel;

traversing the first vertical band of pixels from the origin to the bottom to determine a bottommost foreground pixel; and determining the first image portion as spanning the first vertical band of pixels from the topmost foreground pixel to the bottommost foreground pixel.

11. A system for compressing an image, comprising:

a processor; and a memory communicatively coupled to the processor when the system is operational, the memory bearing processor-executable instructions that, upon execution by the processor, cause the system at least to:

determine a top and bottom of a row of text within the image based on a number of background pixels in two adjacent horizontal rows of pixels of the image;

determine a first vertical band of pixels of the row of text, the first vertical band of pixels spanning between the top and bottom and comprising a first sub-glyph;

store the first sub-glyph in a first memory location; and in response to determining that a second vertical band of pixels of the row of text comprises a second sub-glyph that matches the first sub-glyph, store a reference to the first sub-glyph.

12. The system of claim 11, wherein the memory further bears processor-executable instructions that, upon execution by the processor, cause the system at least to:

while storing the first vertical band of pixels in a cache of a processor to determine the first vertical band of pixels, determine a color of a first pixel of the first sub-glyph;

store a reference to the color in a table, the reference being expressed in fewer bits than the color is expressed in; and replace the color of the first pixel with the reference to the color.

13. The system of claim 11, wherein the memory further bears processor-executable instructions that, upon execution by the processor, cause the system at least to:

send the first sub-glyph and the reference to the first sub-glyph to a client via a remote presentation session, such that, in response to receiving the first sub-glyph and the reference to the first sub-glyph, the client displays a graphical output comprising a representation of the first sub-glyph and the second sub-glyph.

14. The system of claim 13, wherein the processor-executable instructions that, upon execution by the processor, cause the system to at least send the sub-glyph and the reference to the first sub-glyph to the client via a remote presentation session further cause the system at least to:

send the first sub-glyph and the reference to the first sub-glyph to the client via a remote presentation session in response to determining that the first sub-glyph and the reference to the first sub-glyph together do not exceed a storage threshold.

15. The system of claim 13, wherein the memory further bears processor-executable instructions that, upon execution by the processor, cause the system at least to:
  compress the first sub-glyph and the reference to the first sub-glyph before sending the first sub-glyph and the reference to the first sub-glyph to the client.

16. The system of claim 11, wherein the row of text comprises a plurality of sub-glyphs, the plurality of sub-glyphs comprising the first and second sub-glyphs, and wherein the memory further bears processor-executable instructions that, upon execution by the processor, cause the system at least to:
  determine that a number of matching sub-glyphs in the plurality of sub-glyphs is below a threshold;
  encode the plurality of sub-glyphs, such that the reference to the first sub-glyph is not used; and
  send the encoded plurality of sub-glyphs to a client via a remote presentation session, such that, in response to receiving the encoded plurality of sub-glyphs, the client displays a graphical output comprising a representation of the plurality of sub-glyphs.

17. The system of claim 11, wherein the memory further bears processor-executable instructions that, upon execution by the processor, cause the system at least to:
  replace a color value of each pixel of the first sub-glyph with a reference to a color table, the reference being expressed in fewer bits than the color value before storing the first sub-glyph in the first memory location.

18. The system of claim 11, wherein the processor-executable instructions that, upon execution by the processor, cause the system to at least determine the top and bottom of the row of text within the image based on the number of background pixels in two adjacent horizontal rows of pixels of the image further cause the system at least to:
  determine the top and bottom of the row of text based on a distribution of background pixels to foreground pixels in the two adjacent horizontal rows of pixels.

19. The system of claim 11, wherein the memory further bears processor-executable instructions that, upon execution by the processor, cause the system at least to:
  determine a top and a bottom of a second row of text within the image; and
  in response to determining that a third vertical band of pixels of the second row of text comprises a third sub-glyph that matches the first sub-glyph, store a second reference to the first sub-glyph.

20. A computer-readable storage medium for compressing an image, bearing computer-readable instructions that, when executed upon a computer, cause the computer to perform operations comprising:
  determining a top and bottom of a row of text within the image based on a number of background pixels in two adjacent horizontal rows of pixels of the image;
  determining a first vertical band of pixels of the row of text, the first vertical band of pixels spanning between the top and bottom and comprising a first sub-glyph;
  storing the first sub-glyph in a first memory location; and
  in response to determining that a second vertical band of pixels of the row of text comprises a second sub-glyph that matches the first sub-glyph, storing a reference to the first sub-glyph.

* * * * *